May 12, 1964 M. H. KITTELSON 3,132,898
IMPACT ABSORBING SEAT BELT
Filed Aug. 8, 1961 2 Sheets-Sheet 1

INVENTOR.
MATHIAS H. KITTELSON
BY
Carlsen and Carlsen
ATTORNEYS

May 12, 1964  M. H. KITTELSON  3,132,898
IMPACT ABSORBING SEAT BELT
Filed Aug. 8, 1961  2 Sheets-Sheet 2
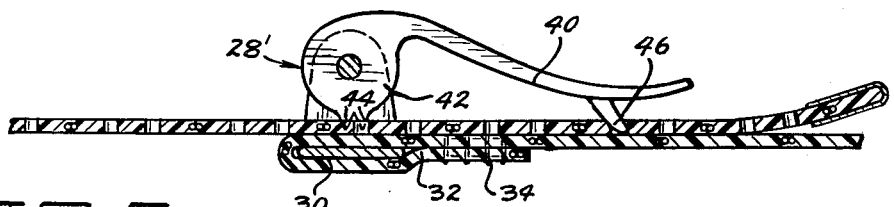
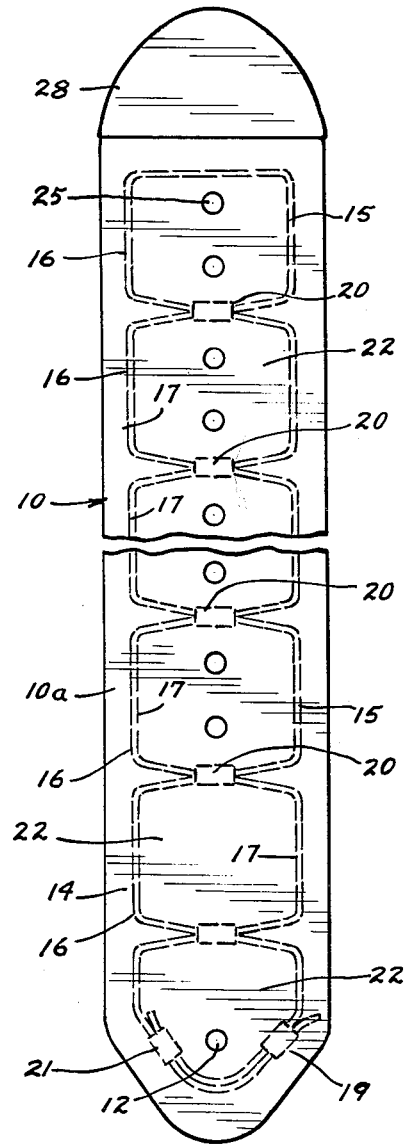
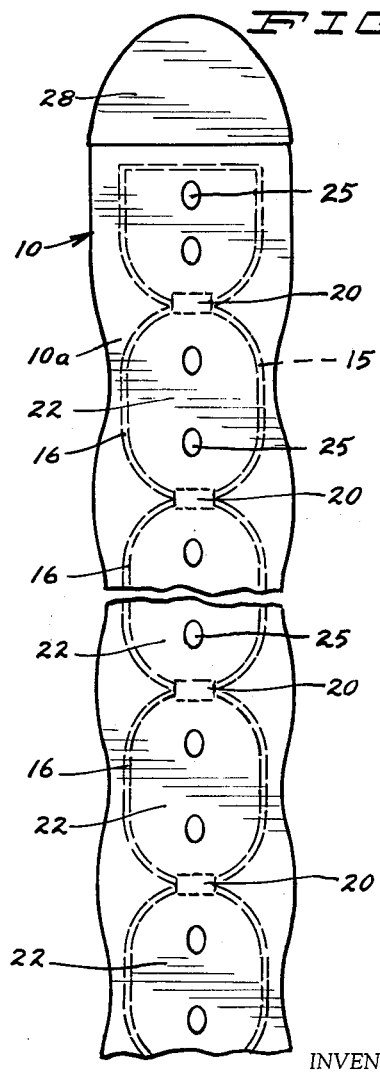
INVENTOR.
MATHIAS H. KITTELSON
BY
Carlsen and Carlsen
ATTORNEYS

United States Patent Office 3,132,898
Patented May 12, 1964

3,132,898
IMPACT ABSORBING SEAT BELT
Mathias H. Kittelson, 4606 Casco Ave.,
Minneapolis 24, Minn.
Filed Aug. 8, 1961, Ser. No. 130,035
5 Claims. (Cl. 297—386)

The present invention relates to seat belts and more particularly to impact absorbing seat belts of the type commonly used in automobiles and aircraft for the purpose of securing personnel in their seats in the event of a collision.

The seat belts presently in use ordinarily comprise a pair of relatively rigid straps each of which is secured to one side of a seat. The free end portions of the belts are secured together over the body of the user. In some of the belts which have been previously proposed, a portion of the belt is formed from an elastic or a yieldable material such as yieldable plastic material for the purpose of cushioning impact. While the yieldable or elastic materials do provide the desired cushioning, the ultimate tensile strength of the yieldable material is often only slightly in excess of the force exerted at the yield point. Thus, these belts can be ruptured by the application of forces only slightly in excess of that required to elongate the yieldable material of the belt. It has also been shown that a yieldable belt material may be strengthened with a rigid reinforcing material, but such rigid materials interfere with the elongation of the yieldable material.

Seat belts have been previously provided wherein a clasp or clamp having transverse gripper lugs is used to hold the free ends of the belts together. Such a clamp permits fastening together of the free ends at an infinite number of positions so that the belt can be fastened snugly around the body of a person of any size. On the other hand, in this type of clamp, it is possible for the belt to slip relative to the clamp under extreme pressures thereby defeating the purpose of the belt.

Thus it is an important object of the present invention to provide an improved impact absorbing seat belt including an extensible or yieldable material to reduce shock and also including means to prevent further extension or breakage of the belt after the yieldable material has been elongated or otherwise distorted.

It is another object of this invention to provide an impact absorbing seat belt which can be clamped snugly against the body of the person of any size but wherein means are provided for more securely locking the ends of the belt together in the event the force applied to the belt exceeds the gripping strength of the clamp.

It is yet another object of the present invention to provide an improved impact absorbing seat belt incorporating both a yieldable or extensible material and also a relatively non-extensible reinforcing material and wherein longitudinal elongation of the belt causes the non-yieldable material to compress the yieldable material laterally.

It is still a further object of the present invention to provide an improved impact absorbing seat belt which is rugged in construction, reliable in operation and can be manufactured economically.

These and other more detailed and specific objects will be disclosed in the course of the folowing specification, reference being had to the accompanying drawings, in which FIG. 1 is a vertical longitudinal sectional view taken through the clamp and belt according to the present invention with the clamp in the disengaged position.

FIG. 5 is a longitudinal vertical sectional view illustrating a preferred method of forming the belt according to this invention.

FIG. 6 is a plan view of the belt in an unstressed condition.

FIG. 7 is a plan view of the belt as it is being stretched longitudinally.

Briefly stated, the present invention provides an improved impact absorbing seat belt comprising a plurality of side-by-side loops of flexible relatively non-extensible elongate reinforcing material connected together in series to form a string of such loops. A yieldable material is positioned in the center of each such loop and lies in contact with at least the inside edges of the loops. Gripping means are secured to said belt to hold the belt ends together.

The non-extensible material preferably comprises wire cable or the like while the yieldable material preferably comprises a plastic resin. According to a preferred form of the present invention, a single cable is formed into a first plurality of undulations then folded back on itself and formed into a second plurality of undulations adjacent the first set but extending in the opposite direction. These undulations are fastened together at their intersections thus providing a plurality of loops joined together in side-by-side relationship. The yieldable plastic material preferably completely surrounds the loops of cables, the loops being embedded in the plastic material.

According to a preferred form of the invention, at least a portion of the belt is provided with a plurality of longitudinally spaced apart openings. A gripping means secured to one end of the belt includes a clamp having a plurality of gripping lugs or ridges adapted to engage the surface of the belt. The gripping means also preferably includes a hook or prong adapted to engage one of the spaced apart openings in the event that the portion of the belt held by the clamp should begin to slip with respect to the clamp, the prong being further adapted to securely engage one of the connections between the loops of cable thus transferring the load to the cable and thereby securely retaining the belt against further slippage.

Figure 4:
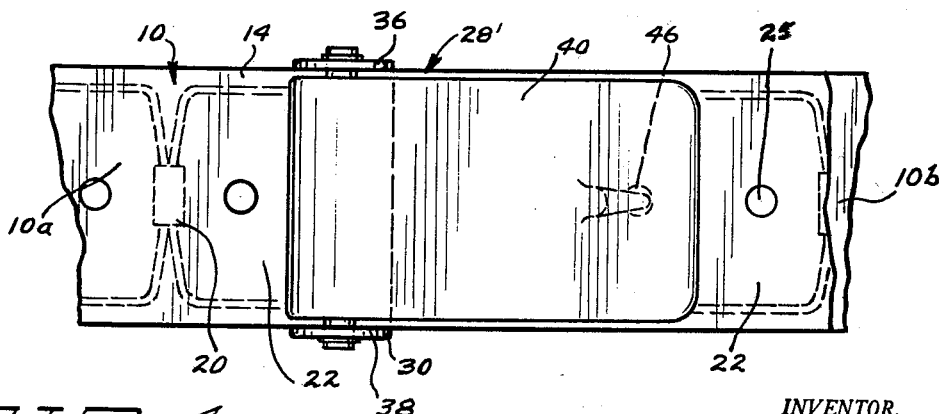
FIG. 4 is a plan view of the belt and clamp mechanism.

Referring now to the figures, there is shown a belt 10 according to the present invention which is preferably divided into two separate parts designated 10A and 10B best seen in FIG. 4. One end of each of the parts 10A and 10B may be secured to sides of a seat (not shown) in any suitable known manner. For this purpose, one end of each part can be provided with an opening 12 at one end through which a fastening lug (not shown) can be secured.

The belt 10 comprises a casing or sheath 14 formed preferably from a yieldable plastic resinous material. One preferred material from which the casing 14 can be formed is polyvinyl chloride sheeting. Other suitable materials which can be used will be apparent to those skilled in the art. While a plastic resin is preferred, other materials may be used and for some purposes a woven fabric may be suitable.

Contained within the casing 14 and completely embedded therein, are a series of longitudinaly extending side-by-side loops 16, of a flexible but relatively non-extensible elongate material such as steel wire or cable 15. While a single strand of said cable has been shown, as best seen in FIG. 6, it will be readily understood that several lengths of the cable may be employed and, if desired for example, each of the loops 16 may comprise a separate length of cable.

According to a preferred form of the invention, a single length of cable 15 is employed. The cable 15 is divided into two portions doubled back on each other as best seen in FIG. 6. Each portion includes a plurality of lateral undulations 17. The ends of the cable 15 can be secured together by means of any suitable fasteners such as swaged ferrules 19 and 21. The undulations 17 of one portion of the cable 15 extend to the left while the undulations of the other portion extend to the right thus forming the loops 16. At their points of intersection, the cables are rigidly secured together by any suitable fastening means such as swaged ferrules 20 as best seen in FIGS. 4, 5, 6 and 7.

As best seen in FIG. 5, the loops of non-extensible material 16 can be embedded within the encapsulating material 14 by providing a first sheet of encapsulating material 24 above the loops and a second sheet of encapsulating material 26 below the loops. These sheets can then be bonded together between the loops and also laterally of the loops. While an adhesive may be used to bond the sheets 24 and 26 together, they are preferably fusion bonded by means of heat and pressure thus forming a single integral casing 14. At the free ends portions of each section of belt 10A and 10B, there is preferably provided a metallic reinforcing member 28 covering the end of the belt.

Between each of the loops 16 there is thus provided a body 22 of yieldable or compressible material best seen in FIGS. 4, 6 and 7. While in a preferred form of the invention, the yieldable compressible bodies 22 form an integral part of the encapsulating material 14 of the belt, it will be understood that they could, if desired, be formed from separate bodies, one such body being placed in the center of each of the loops.

The buckle or belt clamp indicated generally at 28' and best seen in FIGS. 1 through 4, comprises a frame member 30 which extends transversely of the belt 10B and is rigidly secured thereto by any suitable means as by wrapping the end portion 32 of belt 10B around the member 30 and stitching the end of the belt to itself at 34. Carried at opposite ends of the base portion 30 and extending upwardly therefrom are a pair of journal members 36 and 38. Pivotally connected between these journal members is a clasp member 40. The belt clamp 40 includes a clamp portion 42 having a plurality of transversely extending ribs or lugs 44 adapted to engage and securely retain the belt 10A with respect to the belt 10B. To provide further gripping action, the exposed surface of the portion of the belt 10A may be provided with laterally extending ridges and grooves. The clamp member 40 is provided with a downwardly extending hook or prong 46 for purposes hereinafter explained. A plurality of longitudinally spaced apart openings 25 are provided in belt portion 10B, each positioned within one of the loops 16.

Figure 1:
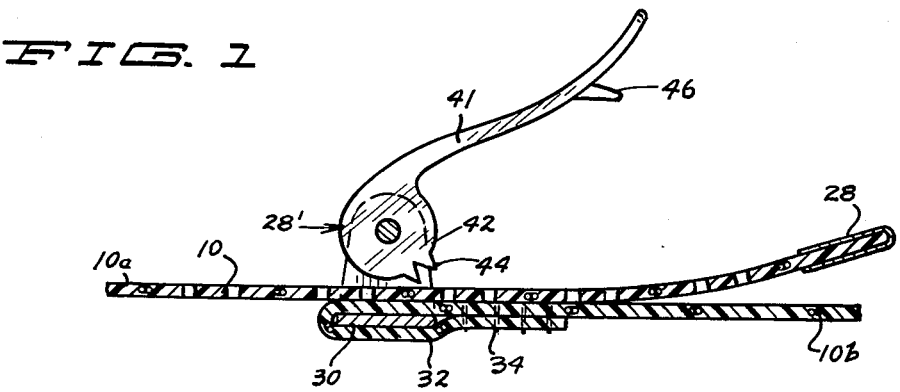
Figure 2:
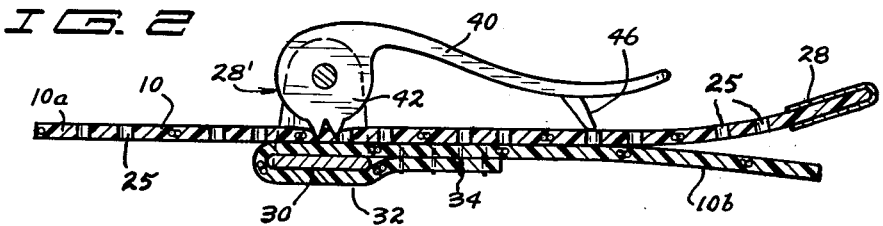
FIG. 2 is an illustration similar to FIG. 1 but with the clamp in the locked position as it appears during normal use.
Figure 3:
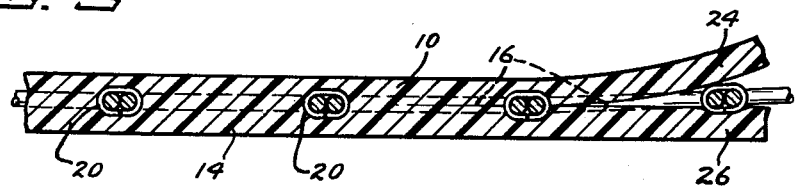
FIG. 3 is a view similar to FIGS. 1 and 2 but illustrating the clamp in the cable engaging position taken when the belt is subjected to severe stresses.

When the belt is to be fastened, the user inserts the free end of the belt portion 10A through the buckle or clamp 28' as shown in FIG. 1, and then rotates the clamp portion 40 in a clockwise direction to the position shown in FIG. 2 until the ribs or lugs 44 securely engage the upper portion of the belt 10A. Since the lugs 44 can engage the belt at an infinite number of points along its length, the belt can thus be tightened to fit snugly around persons of any size. The clamp 40, during normal use, retains the position shown in FIG. 2, the hook or prong 46 resting on top of the exposed surface of the belt portion 10A and does not necessarily pass through one of the openings 25. When an impact exceeding, for example, five G's, is applied to the belt, it will begin to elongate. This force will be concentrated on the lugs 44 thereby causing the clamp member 40 to turn farther in a clockwise direction forcing the prong 46 into one of the openings 25 as shown in FIG. 3. As the force on the belt continues to increase, the prong 46 may break through the material between the openings 25 until the prong 46 contacts one of the swaged ferrules 20 thus preventing further slippage of the belt through the clamp 28 and transferring the load from the lugs 44 to the prong 46 and wire cable 15.

As the belt continues to stretch, the flexible loops 16 are elongated. This in turn compressing laterally the yieldable material between the loops which exert a gradually increasing resistance thereby absorbing the energy of impact but without substantial stretching or elongation of the flexible wire elements.

When a force, for example on the order of 15 G's is developed, the prong 46 may tear its way through the belt material, rather than as described above. The subsequent engagement of the prong with one of the swaged ferrules will, of course, firmly hold the belt against further movement with respect to the clamp and will carry the load back to the belt anchor bolts through the wire cable 15.

Elongation of the loops 16 and transverse compression of the material 22 between the loops is clearly shown in FIG. 7.

While the belt can be, if desired, divided into two portions 10A and 10B, as described, it will be understood that a single length of belt can be employed, if desired, with the center section of the belt extending across the back of the seat.

The belt 10 of the present invention, is rugged in construction, reliable in operation and can be economically manufactured. It can be adjusted to exactly fit a person of any size since the clamp member 40 can be secured to the belt portion 10A at an infinite number of positions. The belt will reduce the impact to which the user is subjected since it is able to stretch a limited distance and the cable 15 will prevent breakage of the belt. When the belt begins to stretch, the prong 46 will securely engage one of the cable loops thus providing a positive connection between cable and the seat anchor bolt to which the other end of the belt is attached.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. An impact absorbing seat belt comprising in combination an elongate non-extensible flexible member including a first portion having a plurality of lateral undulations, a second portion folded back on said first portion and including a like plurality of lateral undulations, the undulations in said second portion being extended in the opposite directions of first undulations, means connecting together said member at the points of intersection to form a series of loops, a yieldable material secured within said loops and a belt clamp secured to one end of said member.

2. An impact absorbing seat belt comprising in combination a loosely twisted cable member including at least two strands, fastening means securing together said cable member at the intersections of said strands, a plastic sheet encasing said cable, said belt including a plurality of longitudinally spaced apart openings therein, said openings passing through said loops, a clasp connected to said belt, said clasp including a prong adapted to enter said openings, said prong being adapted to rupture the intervening portion of said plastic sheet and engage the connected portion of the said loops when said belt is subjected to severe stresses thereby securely retaining said belt against movement relative to said clasp.

3. An impact absorbing seat belt comprising in combination a flat elongate casing formed from a yieldable plastic resinous material, a plurality of loops of flexible relatively non-extensible wire embedded in said casing, said loops being positioned longitudinally of said belt in side-by-side relationship, fasteners connecting said loops together at their points of intersection, said belt being divided into two portions, one such portion including a plurality of longitudinally spaced apart transverse openings therein between said loops and being fastenable at one end to said seat, the other portion of said belt being fastenable to said seat at one end and including at the other end a belt clasp, said belt clasp including a pair of spaced apart journal members and a clamp member pivotally connected between said journal members, said clamp member including a portion engageable with said transverse openings in first belt portion to rupture the intervening plastic resinous material and retain said first belt portion securely with respect to said other belt portion.

4. An impact absorbing seat belt comprising a flat elongate casing formed from a yieldable material, a plurality of loops of flexible relatively non-extensible elongate material embedded in said casing, said loops being positioned axially of said belt in side-by-side relationship, means connecting together said loops at their points of intersection, said belt including a plurality of longitudinally spaced apart openings therein between said loops, a belt buckle securely attached to one end of said belt, said buckle including a pivoted clamp member adapted to securely fasten portions of said belt together and said clamp member including a hook, said hook being adapted to enter one of said longitudinally spaced apart openings upon exposure to relatively large forces and thereby rupture the intervening portion of said casing and engage one of said loops thereby securely preventing slippage of said belt with respect to said buckle, elongation of said belt being adapted to compress said yieldable material laterally without causing substantial elongation of said loops of flexible material.

5. In fastening means for use in combination with a body restraining seat belt having load responsive extensible energy absorbing characteristics and including a plurality of interconnected loops of inextensible material surrounding areas of energy absorbing material, the combination, comprising; a pair of spaced apart journal members; a clamp member pivotally journalled between said journal members, said clamp member including a portion engageable with a seat belt to frictionally engage the same and a further portion adapted to penetrate and rupture the intervening energy absorbing material in a seat belt in response to a load of predetermined magnitude tending to break said frictional engagement.

References Cited in the file of this patent
UNITED STATES PATENTS

| | | |
|---|---|---|
| 1,444,274 | Rigdon | Feb. 6, 1923 |
| 1,528,310 | Strzyczkowski | Mar. 3, 1925 |
| 2,494,262 | Pease | Jan. 10, 1950 |
| 2,690,985 | Poole | Oct. 5, 1954 |
| 2,710,649 | Griswold | June 14, 1955 |
| 2,871,927 | Materi | Feb. 3, 1959 |
| 2,945,390 | Bush | July 19, 1960 |